United States Patent
Zeng et al.

(10) Patent No.: US 12,174,402 B2
(45) Date of Patent: Dec. 24, 2024

(54) GRATING AND DISPLAY DEVICE

(71) Applicant: Xiamen Tianma Micro-Electronics Co., Ltd., Xiamen (CN)

(72) Inventors: Yang Zeng, Shanghai (CN); Shihao Tang, Shanghai (CN); Yaodong Wu, Shanghai (CN); Ziyu Shi, Shanghai (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 519 days.

(21) Appl. No.: 17/453,104

(22) Filed: Nov. 1, 2021

(65) Prior Publication Data

US 2022/0276418 A1 Sep. 1, 2022

(30) Foreign Application Priority Data

Feb. 26, 2021 (CN) .......................... 202110218376.X

(51) Int. Cl.
*G02B 5/18* (2006.01)
(52) U.S. Cl.
CPC .................................. *G02B 5/1814* (2013.01)
(58) Field of Classification Search
CPC .............................. G02B 5/1814; G02F 1/292
See application file for complete search history.

(56) References Cited

U.S. PATENT DOCUMENTS

2014/0293173 A1* 10/2014 Koito ................... H04N 13/324
349/15

FOREIGN PATENT DOCUMENTS

| CN | 103809283 A | 5/2014 |
|---|---|---|
| CN | 106918956 A | 7/2017 |
| CN | 109613740 A | 4/2019 |

* cited by examiner

*Primary Examiner* — Joseph P Martinez
(74) *Attorney, Agent, or Firm* — Anova Law Group, PLLC

(57) ABSTRACT

A gating and a display device are provided. The grating includes a first substrate and a second substrate disposed opposite to the first substrate; a grating electrode layer including a plurality of grating electrodes and disposed on the first substrate, and a supporting structure including a plurality of first supporting pillars. An extension direction of the plurality of grating electrodes is a first direction; a size L11 of a first supporting pillar of the plurality of first supporting pillars along the first direction is greater than a size W11 of the supporting pillar along a second direction; the first direction and the second direction are both parallel to a plane where the first substrate is located; and the first direction is perpendicular to the second direction.

20 Claims, 12 Drawing Sheets

GRATING AND DISPLAY DEVICE

CROSS-REFERENCE TO RELATED APPLICATION

This application claims the priority of Chinese Patent Application No. 202110218376.X, filed on Feb. 26, 2021, the content of which is incorporated by reference in its entirety.

TECHNICAL FIELD

The present disclosure generally relates to the field of display technology and, more particularly, relates to a grating and a display device.

BACKGROUND

Three-dimensional image display technology is used to display a three-dimensional scene and becomes more popular, as it is difficult to use two-dimensional display to provide three-dimensional depth information clearly and accurately.

Three-dimensional (3D) holographic display technology uses light diffraction or interference to record the amplitude and the phase information of the object light, and then reconstructs the object light information through the light diffraction, and it is the only true three-dimensional display technology among various display methods.

When the existing 3D holographic display devices perform three-dimensional image display, after a spatial light modulator (SLM) modulates the phase and the amplitude of the optical signal, and it generally realizes the deflection of light through the diffraction function of the grating to form a three-dimensional image. However, the existing gratings are often damaged during production, which affects the display quality of the 3D holographic display device.

Therefore, there is need to improve the quality of the grating in the 3D holographic display device. The disclosed gratings and display devices are directed to solve one or more problems set forth above and other problems in the art.

SUMMARY

One aspect of the present disclosure provides a grating. The grating may include a first substrate and a second substrate disposed opposite to the first substrate; a grating electrode layer including a plurality of grating electrodes and disposed on the first substrate, and a supporting structure including a plurality of first supporting pillars. An extension direction of the plurality of grating electrodes is a first direction; a size L11 of a first supporting pillar of the plurality of first supporting pillars along the first direction is greater than a size W11 of the supporting pillar along a second direction; the first direction and the second direction are both parallel to a plane where the first substrate is located; and the first direction is perpendicular to the second direction.

Another aspect of the present disclosure provides a display device. The grating may include a first substrate and a second substrate disposed opposite to the first substrate; a grating electrode layer including a plurality of grating electrodes and disposed on the first substrate, and a supporting structure including a plurality of first supporting pillars. An extension direction of the plurality of grating electrodes is a first direction; a size L11 of a first supporting pillar of the plurality of first supporting pillars along the first direction is greater than a size W11 of the supporting pillar along a second direction; the first direction and the second direction are both parallel to a plane where the first substrate is located; and the first direction is perpendicular to the second direction.

Other aspects of the present disclosure can be understood by those skilled in the art in light of the description, the claims, and the drawings of the present disclosure.

BRIEF DESCRIPTION OF THE DRAWINGS

To more clearly illustrate the technical solutions in the embodiments of the present disclosure or the prior art, the following will briefly introduce the drawings needed in the description of the embodiments or prior art. Obviously, the drawings in the following description are only some embodiments of the present disclosure. For those of ordinary skill in the art, other drawings can be obtained based on these drawings without creative work.

DETAILED DESCRIPTION

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments in this disclosure, all other embodiments obtained by those of ordinary skill in the art without creative work shall fall within the protection scope of this disclosure.

In the following description, many specific details are explained to fully understand this disclosure, but this disclosure can also be implemented in other ways different from those described here, and those skilled in the art can do so without departing from the connotation of this disclosure. Similar promotion, therefore, this disclosure is not limited by the specific embodiments disclosed below.

Secondly, this disclosure will be described in detail in conjunction with schematic diagrams. In detailing the embodiments of this disclosure, for ease of description, the cross-sectional view showing the device structure will not be partially enlarged according to general scale, and the schematic diagram is only an example, which should not be limited by the scope of protection of this disclosure. In addition, the three-dimensional dimensions of length, width and depth should be included in the actual production.

As mentioned in the background art, the existing gratings are often damaged during the production, which affects the display quality of 3D holographic display devices.

A grating usually includes a first substrate and a second substrate that are opposed to each other, and a plurality of grating electrodes and a plurality of supporting pillars between the first substrate and the second substrate. In the actual production process, the grating electrodes are usually formed first, and then the supporting pillars are formed. The support pillars are inevitably be located directly above the grating electrodes and crush the grating electrodes directly below the support pillars. Further, the greater the number of the grating electrodes overlapping the supporting pillars, the larger the area where the grating can no longer achieve light deflection due to the crushing of the grating electrodes, the greater the failure probability of the gratings caused by the damage, and the display quality of the 3D holographic display device is affected.

Figure 1:
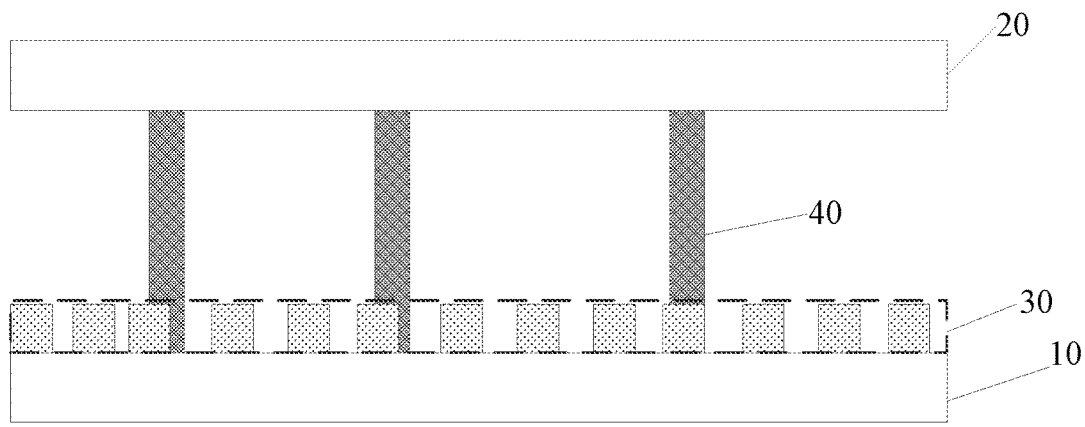
FIG. 1 illustrates a cross-sectional view of an exemplary grating consistent with various disclosed embodiments of the present disclosure.

The present disclosure provides a grating and display device. FIG. 1 illustrates a cross-sectional view of an exemplary grating consistent with various disclosed embodiments.

As shown in FIG. 1, the grating may include a first substrate 10 and a second substrate 20. The first substrate 10 and the second substrate 20 may be arranged opposite to each other.

The grating may also include a grating electrode layer 30. The grating electrode layer 30 may be disposed on the first substrate 10. The grating electrode layer 30 may include a plurality of grating electrodes. The extension direction of the grating electrodes may be a first direction.

Further, the grating may include a supporting structure 40. The supporting structure 40 may include a plurality of first supporting pillars.

Figure 2:
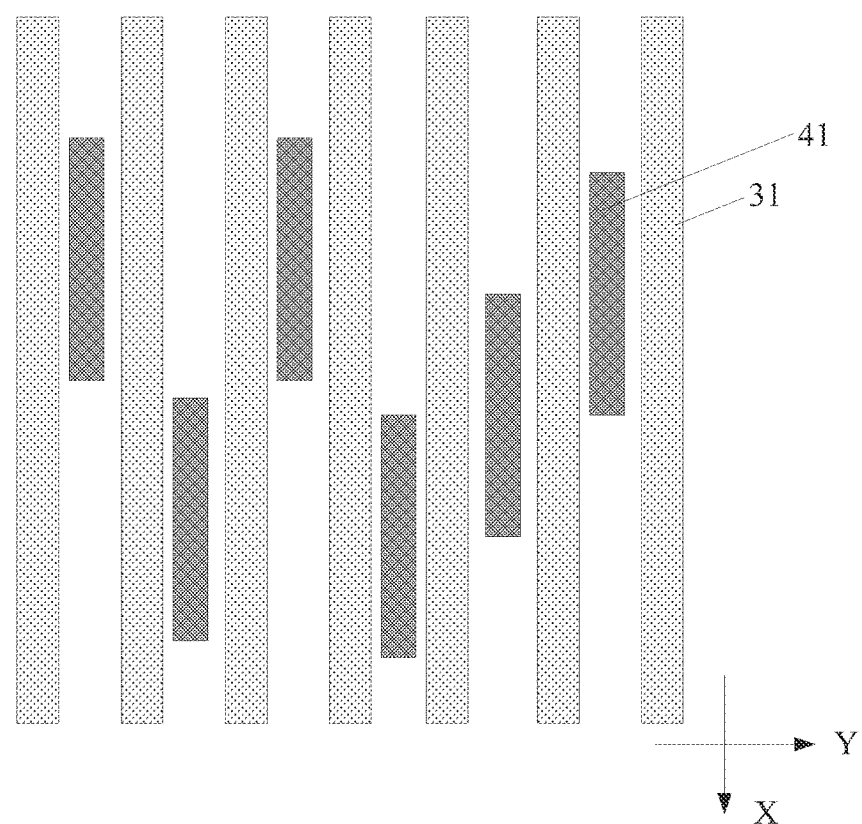
FIG. 2 illustrates a top view of an exemplary grating consistent with various disclosed embodiments of the present disclosure.

FIG. 2 illustrates a top view of an exemplary grating consistent with various disclosed embodiments of the present disclosure. As shown in FIG. 2, the size L11 of the first supporting pillar 41 along the first direction X may be greater than the size W11 of the first support pillar 41 along the second direction Y. The first direction X and the second direction Y may both be parallel to the plane where the first substrate 10 is located, and the first direction X may be perpendicular to the second direction Y.

In one embodiment, the size of each of the plurality of first supporting pillars along the first direction may be same or not completely same, which is not limited in the present disclosure, as long as it may ensure that the first supporting pillars may extend along the first direction, and the size L11 of the first supporting pillar along the first direction may be greater than the size W11 of the first support pillar along the second direction Y.

On the basis of the above-mentioned embodiment, in one embodiment of the present disclosure, the dimensions of the first supporting pillars along the second direction are same everywhere, but this disclosure does not limit this. In other embodiments, the dimensions of the first supporting pillars along the second direction may also be different, such as increasing or decreasing along the first direction, depending on the situation. Hereinafter, the grating will be described by taking an example that the sizes of the first supporting pillars along the second direction are the same.

In the grating provided by the present disclosure, the size L11 of the first support pillar along the first direction may be greater than the size W11 of the first support pillar along the second direction, and the first direction is the extension direction (length direction) of the grating electrode, and the second direction may be perpendicular to the first direction. For example, in one embodiment of the present disclosure, the size of the first supporting pillar along the extension direction of the grating electrode may be larger than that of the first supporting pillar along the direction perpendicular to the grating electrode to reduce the number of grating electrodes that overlap with the first supporting pillars under the premise of ensuring the supporting effect of the first supporting pillar. Accordingly, the number of grating electrodes that are crushed by the first support pillars may be reduced, and the failure probability of the grating caused by a large number of grating electrodes crushed by the first support pillars may be reduced, and the display quality of the 3D display device may be enhanced.

It should be noted that when the 3D display device is in operation, the function of the grating may be to deflect the light entering the grating to be perpendicular to its extension direction through a diffraction, and then exit. In the grating provided in the embodiment of the present disclosure, the size of the first supporting pillar along the extension direction of the grating electrode may be greater than the size of the first supporting pillar along the direction perpendicular to the extension direction of the grating electrode such that the size of the first supporting pillar along the direction perpendicular to the extension direction of the grating electrode may be relatively small. Accordingly, when the grating diffracts the light irradiating it, the diffraction effect along the direction perpendicular to the extension direction of the grating electrode may be reduced to reduce the influence of the diffraction effect to the normal diffraction of the light in the grating caused by the diffraction effect (i.e., the extra diffraction) along the direction perpendicular to the extension direction of the grating electrode, and the light modulation accuracy when the grating realizes the deflection of the light may be improved.

Figure 3:
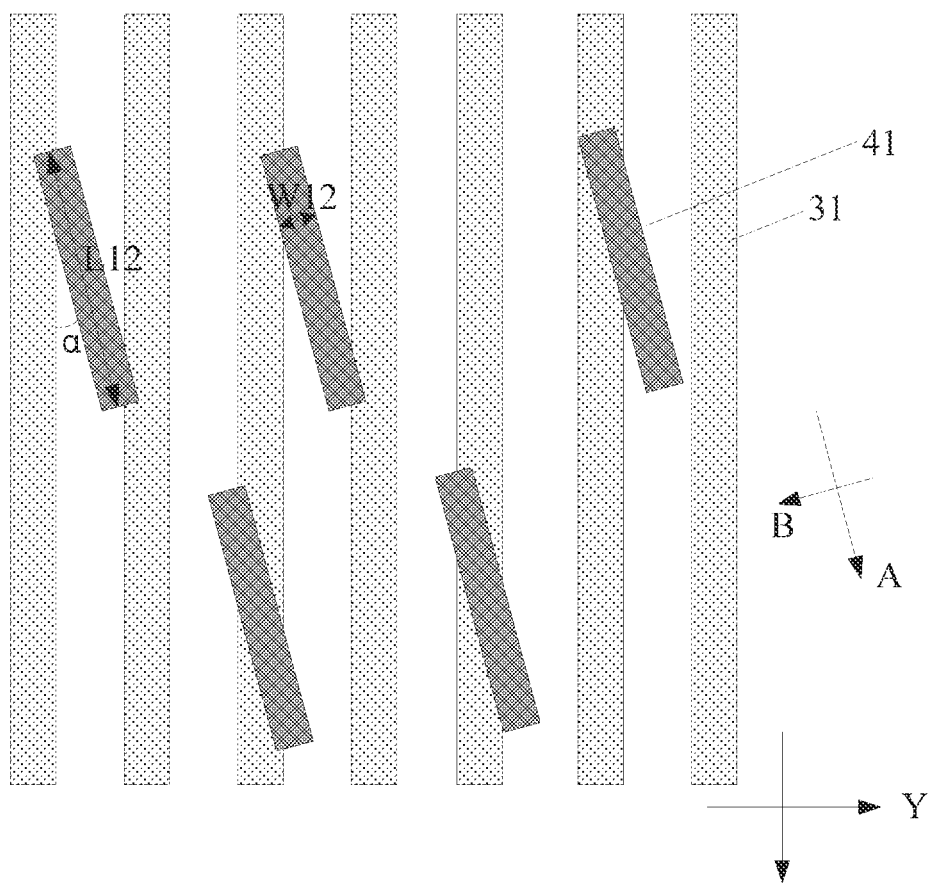
FIG. 3 illustrates a top view of another exemplary grating consistent with various disclosed embodiments of the present disclosure.

On the basis of the foregoing embodiment, in one embodiment of the present disclosure, as shown in FIG. 3, the length of the first supporting pillar 41 along the third direction A may be the largest length L12 of the first supporting pillar 41, and the length of the first support pillar 41 along the fourth direction B may be the largest width W12 of the first support pillar 41. The third direction A and the fourth direction B may be both parallel to the first substrate and the angle between the first direction X and the third direction A is α. L12>W12; and 0≤α<45°. Accordingly, the angle between the direction along which the first supporting pillar 41 may have the maximum size and the extension direction of the grating electrode 31 may be less than 45°; and the first supporting pillar 41 may have the largest size component along the extension direction of the grating electrode 31 to minimize the number of grating electrodes 31 in the grating that overlap with the first supporting pillar 41 to reduce the number of grating electrodes 31 in the grating that are crushed by the first supporting pillars 41. As a result, the probability of failure of the grating caused by the large number of grating electrodes 31 crushed by the first supporting pillars 41 may be reduced. Thus, the display quality of the 3D display device may be improved.

It should be noted that the smaller the angle between the direction along which the first supporting pillar may have the maximum size and the extension direction of the grating electrode, the greater the size component of the first supporting pillar along the extension direction of the grating electrode, and the smaller the number of grating electrodes in the grating that overlap with the first supporting pillars. Therefore, on the basis of the above-mentioned embodiment, in one embodiment of the present disclosure, the first direction and the third direction may coincide to allow the direction along which the first supporting pillar may have the maximum dimension to be parallel to the extension direction of the grating electrode to minimize the number of grating electrodes in the grating that overlap with the first supporting pillars as much as possible. Accordingly, the number of the grating electrodes in the grating crushed by the first supporting pillars may be reduced, and the probability of damage to the grating due to the large number of grating electrodes crushed by the first supporting pillars may be reduced; and the display quality of the 3D display device may be improved.

On the basis of any of the foregoing embodiments, in one embodiment of the present disclosure, the fourth direction may be perpendicular to the third direction to reduce the number of first supporting pillars overlapping the grating electrodes along the direction along which the first supporting pillars may have the maximum width. By reducing the number of first supporting pillars overlapping the grating electrodes along the direction along which the first supporting pillars may have the maximum width, the number of overlapping grating electrodes along the direction along which the first supporting pillars may have the maximum width. Thus, the number of grating electrodes in the grating that are crushed by the first supporting pillars may be reduced, and the probability of damage and failure of the grating caused by the large number of grating electrodes crushed by the first supporting pillars may be reduced, and the display quality of the 3D display device may be improved.

It should be noted that, in one embodiment of the present disclosure, because the fourth direction may be perpendicular to the third direction, when the third direction coincides with the first direction, the fourth direction may also coincide with the second direction. However, the present disclosure is not limited to this. In other embodiments of the present disclosure, the fourth direction may not be perpendicular to the third direction. Under such a configuration, the third direction may coincide with the first direction. When the fourth direction does not coincide with the second direction, or when the fourth direction coincides with the second direction, the third direction may not coincide with the first direction, or the third direction may not coincide with the first direction and the fourth direction may not overlap with the second direction. The relationships of the directions are not limited by the present disclosure, as long as the number of grating electrodes in the grating overlapping the first support pillars may be reduced as much as possible to reduce the number of the crushed grating electrodes in the grating, and reduce the probability of failure of the grating due to crushing of the grating electrodes.

Figure 4:
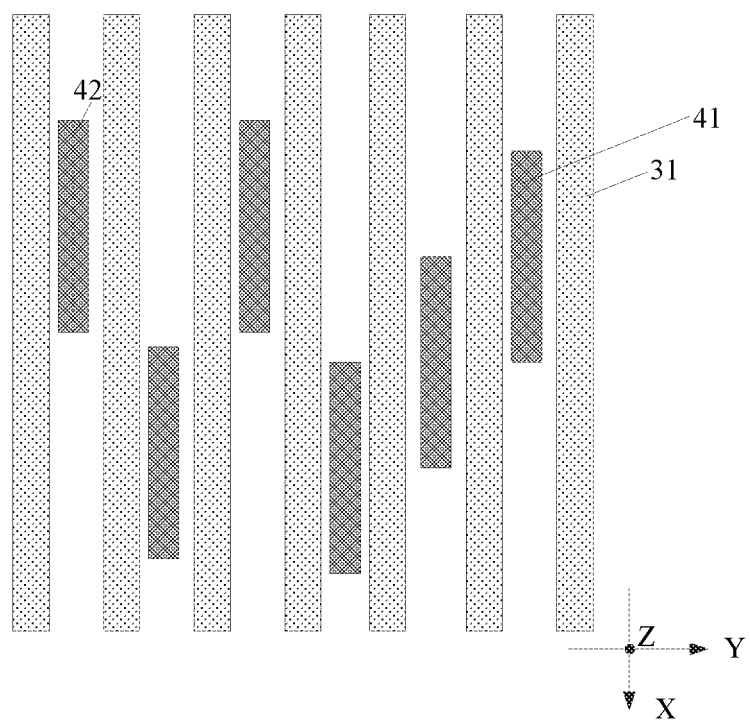
FIG. 4 illustrates a top view of another exemplary grating consistent with various disclosed embodiments of the present disclosure.

On the basis of any of the foregoing embodiments, in one embodiment of the present disclosure, as shown in FIG. 4, the first support pillar 41 may be symmetrical along the first direction X axis, and the first supporting pillars 41 may include a first axis of symmetry 42 extending along the first direction X. Taking the direction Z perpendicular to the surface of the first substrate as the projection direction, the projection of the first axis of symmetry 42 may be located between two adjacent grating electrodes 31 such that the gravity center of the first supporting pillar 41 may be located in the gap between the two adjacent grating electrodes 31, rather than on the grating electrode 31. Thus, on basis that the weight of the first support pillar 41 is fixed, the pressure of the first support pillar 41 on the grating electrode 31 overlapped by the first support pillar 41 may be reduced, and the crushing probability of the grating electrode 31 overlapped by the first support pillar 41 may be reduced.

Figure 5:
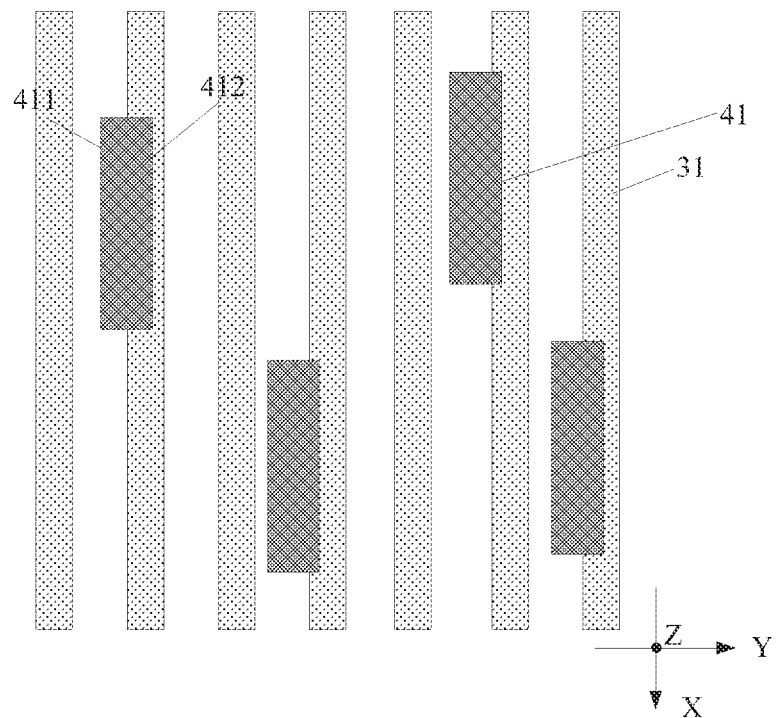
FIG. 5 illustrates a top view of another exemplary grating consistent with various disclosed embodiments of the present disclosure.

On the basis of the foregoing embodiment, in one embodiment of the present disclosure, as shown in FIG. 5, the first supporting pillar 41 may include a first side 411 and a second side 412 extending along the first direction X. Taking the direction Z perpendicular to the surface of the first substrate as the projection direction, the projection of the first side 411 may be located in the gap between the two adjacent grating electrodes 31 such that there may be no overlap between the first side 411 and the grating electrode 31. Accordingly, under the premise that the size of the first supporting pillar 41 along the direction perpendicular to the second direction Y may not change, the number of grating electrodes 31 overlapped by the first supporting pillars 41 may be reduced; the number of crushed grating electrodes 31 in the grating may be reduced; and the probability of the failure of the grating caused by the grating electrode 31 being crushed may be reduced.

Figure 6:
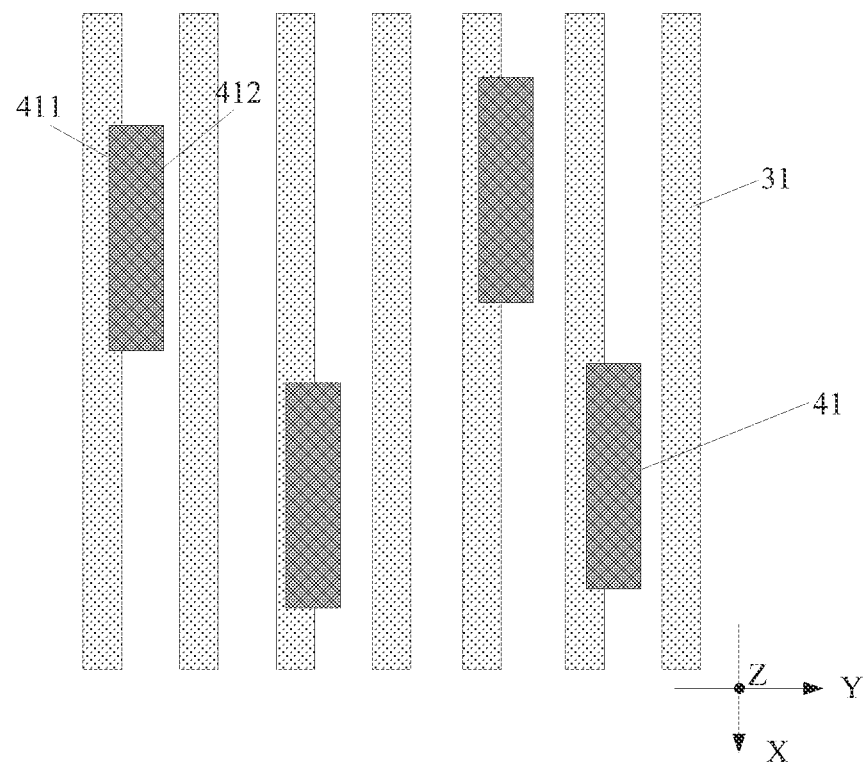
FIG. 6 illustrates a top view of another exemplary grating consistent with various disclosed embodiments of the present disclosure.

In another embodiment of the present disclosure, as shown in FIG. 6, the first support pillar 41 may include a first side 411 and a second side 412 extending along the first direction X. Taking the direction Z perpendicular to the surface of the first substrate as the projection direction, and the projection of the second side 412 may be located in the gap between two adjacent grating electrodes 31 such that the second side 412 of the first support pillar 41 may not overlap the grating electrodes 31. Accordingly, under the premise that the size of the first supporting pillar 41 along the second direction Y remains unchanged, the number of grating electrodes 31 that overlap with the first supporting pillars 41 in the grating may be reduced. Thus, the number of crushed grating electrodes 31 in the grating may be reduced, and the probability of the failure of the grating due to the grating electrodes 31 being crushed may be reduced.

Figure 7:
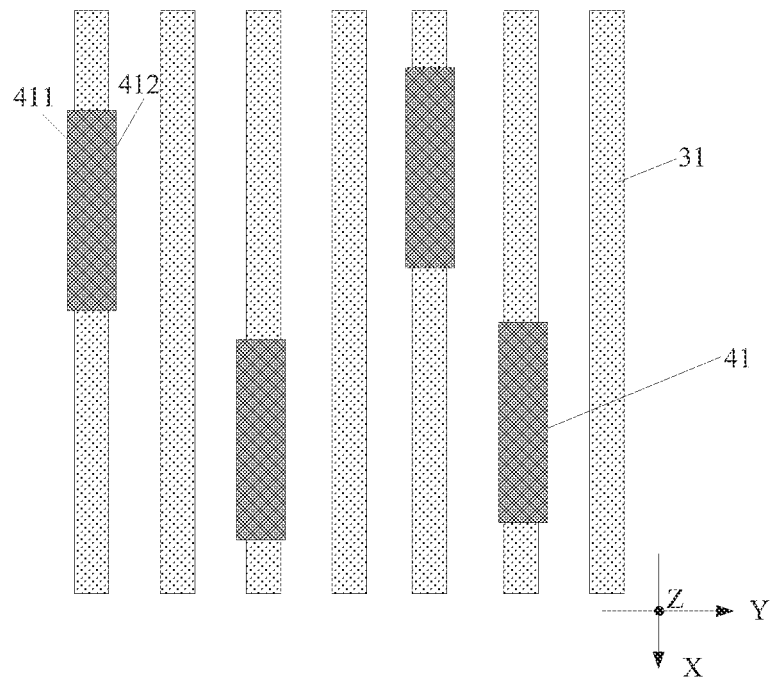
FIG. 7 illustrates a top view of another exemplary grating consistent with various disclosed embodiments of the present disclosure.

In another embodiment of the present disclosure, as shown in FIG. 7, the first support pillar 41 may include a first side 411 and a second side 412 extending along the first direction X. Taking the direction Z perpendicular to the surface of the first substrate as the projection direction, the projection of the first side 411 may be located in the gap between the two adjacent grating electrodes 31, and the projection of the second side 412 may be located in the gap between two adjacent grating electrodes 31 such that the first side 411 of the first supporting pillar 41 may not overlap with the grating electrode 30, and the second side 412 of the first supporting pillar 41 may not overlap with the grating electrode 30 such that, under the premise that the size of the first supporting pillar along the second direction Y remains unchanged, the number of grating electrodes 31 overlapping with the first supporting pillars 41 in the grating may be reduced as much as possible to reduce the number of crushed grating electrodes 31 in the grating. Accordingly, the probability of the failure of the grating due to crushing of the grating electrodes 31 may be reduced.

Figure 8:
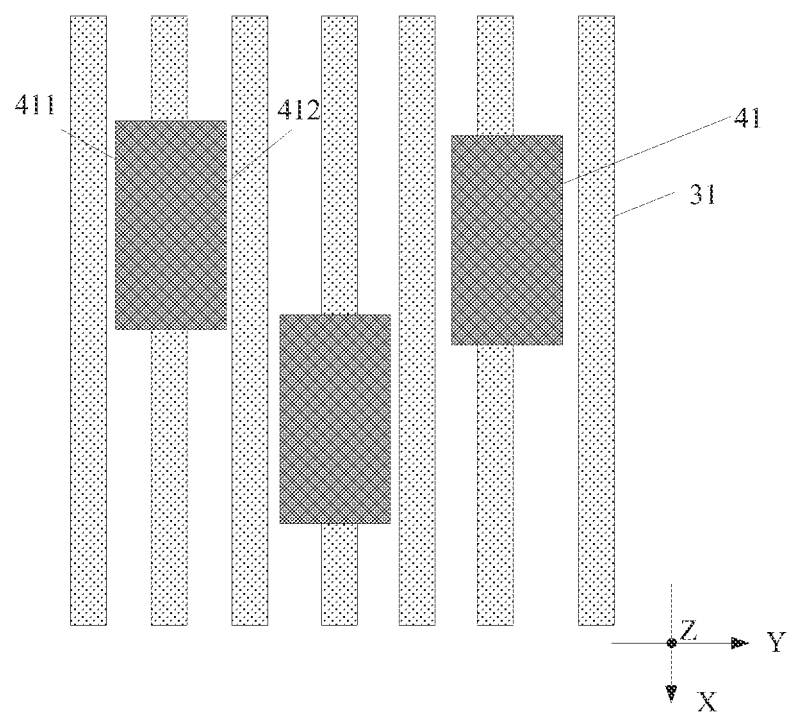
FIG. 8 illustrates a top view of another exemplary grating consistent with various disclosed embodiments of the present disclosure.
Figure 9:
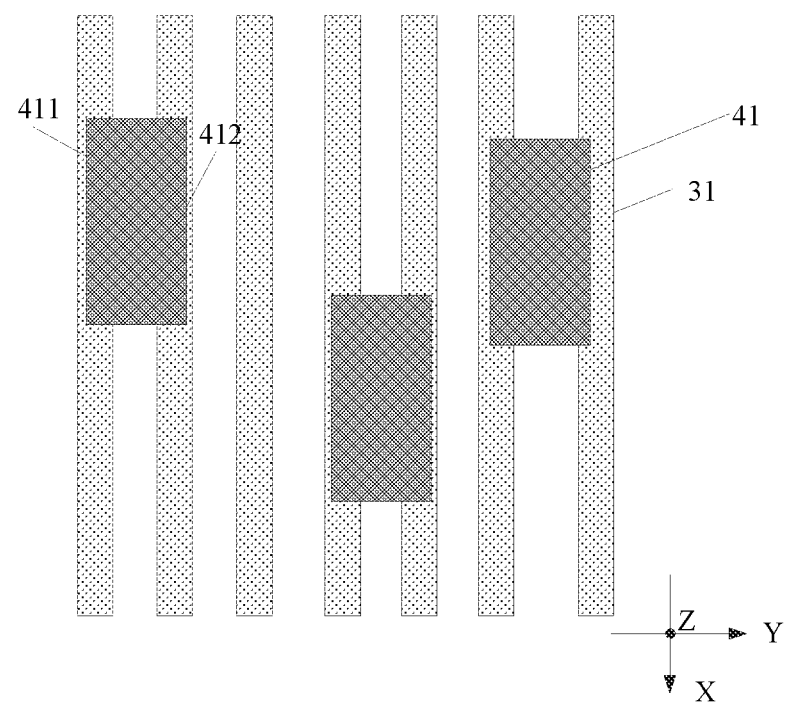
FIG. 9 illustrates a top view of another exemplary grating consistent with various disclosed embodiments of the present disclosure.

For example, in one embodiment of the present disclosure, as shown in FIGS. 8-9, the size of the first supporting pillar 41 along the second direction Y may be larger than the gap between two adjacent grating electrodes 31, but smaller than the sum of the size of one grating electrode 31 and the sizes of the gaps at both sides of the grating electrode 31. If the first side 411 and the second side 412 of the first supporting pillar 41 are both located in the gap between the adjacent grating electrodes 31, the first supporting pillar 41 may only overlap with one grating electrode 31, as shown in FIG. 8. If the first side 411 and the second side 412 of the first supporting pillar 41 overlap with the grating electrode 31, the first supporting pillar 41 may overlap with at least two grating electrodes 31, as shown in FIG. 9. It can be seen that, taking the direction perpendicular to the surface of the first substrate as the projection direction, the projection of the first side may be located in the gap between two adjacent grating electrodes, and the projection of the second side may be located the gap between two adjacent grating electrodes. On the premise that the size of the first supporting pillar along the second direction remains unchanged, the number of grating electrodes in the grating that overlaps with the first supporting pillars may be reduced; and the probability of the failure of the grating due to the grating electrodes being crushed may be reduced.

Figure 10:
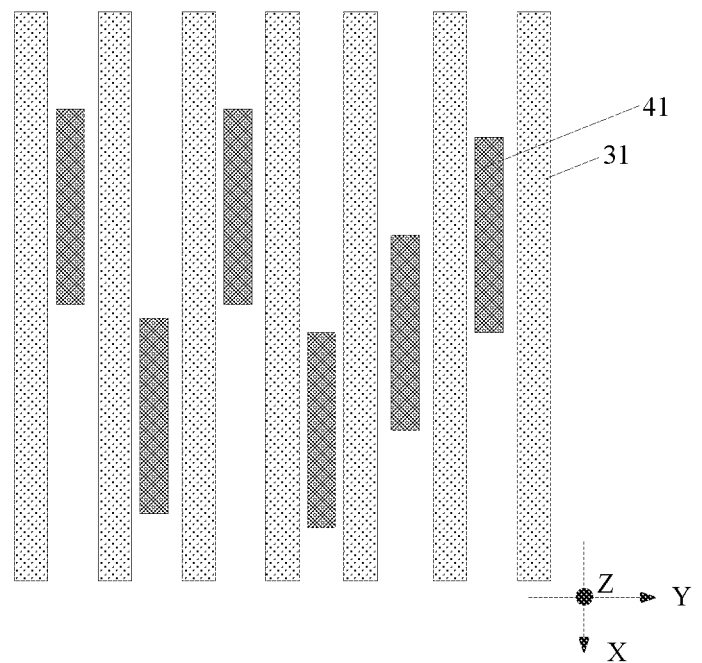
FIG. 10 illustrates a top view of another exemplary grating consistent with various disclosed embodiments of the present disclosure.

On the basis of any of the foregoing embodiments, as shown in FIG. 10, in a specific embodiment of the present disclosure, the size of the first support pillar 41 along the second direction Y may be relatively small, and may be selected to be no larger than the size of the gap between adjacent grating electrodes 31 along the second direction Y. In one embodiment of the present disclosure, taking the direction Z perpendicular to the surface of the first substrate as the projection direction, the projection of the first supporting pillar 41 may be located in gap between adjacent grating electrodes 31 such that the first supporting pillar 41 may not overlap the grating electrode 31 and the grating electrode 31 in the grating may not overlap with the first supporting pillar 41. Accordingly, the damage and failure of the grating electrode due to the grating electrode 31 being crushed by the first supporting pillar 41 may be prevented.

Figure 11:
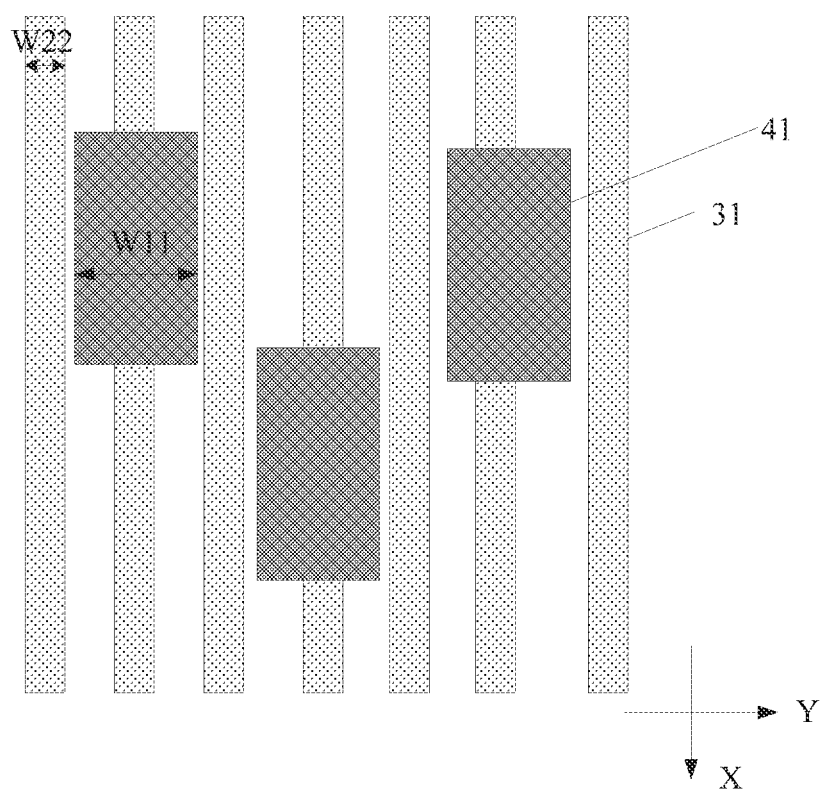
FIG. 11 illustrates a top view of another exemplary grating consistent with various disclosed embodiments of the present disclosure.

On the basis of any of the foregoing embodiments, in one embodiment of the present disclosure, as shown in FIG. 11, the size of the grating electrode 31 along the second direction Y may be referred to as W22, R=W22/W11, and R>⅕. Thus, the size of the first supporting pillar 41 along the second direction Y may be less than 5 times of the size of the grating electrode 31 along the second direction Y. Such a configuration may avoid too many grating electrodes 31 to overlap the supporting pillars 41 caused by the too large size of the supporting pillars along the second direction Y. Accordingly, the issue that too many grating electrodes 31 in the grating are crushed may be avoided, and the failure of the grating electrodes caused by the damage may be avoided.

In one embodiment of the present disclosure, the sizes of the grating electrodes along the second direction may be same everywhere, the present application does not limit this. In some embodiments, the size of the grating electrodes along the second direction may also increase or decrease along the first direction.

It should be noted that when the sizes of the grating electrodes along the second direction increase or decrease along the first direction, the size W22 of the grating electrode along the second direction may the maximum size of the grating electrode along the second direction or the average size of the grating electrode along the second direction, etc.

For example, on the basis of the foregoing embodiment, in one embodiment of the present disclosure, R may be 1, ½, ⅓, or ¼, etc. That is, the ratio of the size of the grating electrode along the second direction to the size of the first supporting pillar along the second direction may be 1, ½, ⅓, or ¼, etc.

On the basis of the foregoing embodiment, in one embodiment of the present disclosure, the dimension W22 of the grating electrode along the second direction may not be greater than 2 microns. For example, the dimension of the grating electrode along the second direction may be equal to or less than 2 microns. The size W11 of the first supporting pillar along the second direction may be in a range of approximately 3 microns-10 microns, including the endpoint value. For example, the size of the first supporting pillar along the second direction may not be less than 3 microns and not more than 10 microns.

It should be noted that when the size of the first supporting pillar along the second direction is greater than the size of the gap between adjacent grating electrodes along the second direction, the less the number of grating electrodes overlapped by the first supporting pillars, the greater the overlapping area of the grating electrode overlapped by the first support pillar. Under the premise that the weight of the first supporting pillar is fixed, the greater the overlapping area of the first supporting pillar and the grating electrode, the smaller the pressure generated by the first supporting pillar on the overlapping area of the grating electrode, and the less likely the grating electrode is to be crushed.

On the basis of any of the foregoing embodiments, in one embodiment of the present disclosure, along the second direction, the grating electrodes overlapping with the first supporting pillars and the first supporting pillars may completely overlap to increase the overlapping area of the first supporting pillars and the overlapping grating electrodes, and under the premise that the weight of the first supporting pillar is fixed, the pressure applied to the overlapping area of the grating electrode and the first supporting pillar may be reduced, and the probability that the grating electrode overlapping with the first supporting pillar is crushed may be reduced.

It should be noted that, if along the second direction, the first support pillars and the grating electrodes completely overlap, the component of the projected area of the first supporting pillar along the second direction may be cos $\alpha \times S1$; and $S1$ the projection area of the first supporting pillar. Further, because the size of the first supporting pillar along the second direction may be R times of the size of the grating electrode along the second direction, the overlapping area of the first supporting pillar and the grating electrode may be $R \times \cos \alpha \times S1$.

When the angle between the maximum length direction of the first supporting pillar and the extension direction of the grating electrode ranges from 0 to 45°, for example, when the angle between the maximum length direction of the first supporting pillar and the extension direction of the grating electrode is 45°, the overlapping area between the first supporting pillar and the grating electrode may be the smallest. At this time, the overlapping area between the first supporting pillar and the grating electrode may be $R \times \sqrt{2}/2 \times S1$.

It can be seen from the foregoing that, to reduce the number of grating electrodes overlapped by the first supporting pillars, $R > \frac{1}{5}$, thus, in one embodiment of the present disclosure, if the number of grating electrodes overlapping the first supporting pillars is wanted to be ensured to be relatively small, the overlapping area of the grating electrodes overlapping the first supporting pillars and the first support pillars may be desired to be increased, and the probability of the failure of the grating electrode overlapping with the first supporting pillar caused by crushing may be desired to be reduced, the overlapping area of the first supporting pillar and the grating electrode may be greater than $\frac{1}{5} \times \sqrt{2}/2 \times S1$. For example, the overlapping area of the first supporting pillar and the grating electrode should be greater than $0.14 \times S1$.

Therefore, in one embodiment of the present disclosure, taking the direction perpendicular to the surface of the first substrate as the projection direction, the projection area of the first supporting pillar may be referred to as S1, and the projections of the first supporting pillars may overlap a number n of grating electrodes, and $n \geq 1$. The smallest area among the overlapping areas between the projections of the first supporting pillars and the number n of grating electrodes may be referred to as S2, and $S2 > 0.14 \times S1$. Thus, under the premise of ensuring that the number of grating electrodes overlapped with the first supporting pillars is relatively small, the pressure on the grating electrodes overlapping with the first supporting pillars may be reduced; and the probability of the grating electrodes overlapping with the supporting pillar being crushed may be reduced, and the probability that the grating may be damaged due to the crushing of the grating electrodes may be reduced.

Figure 12:
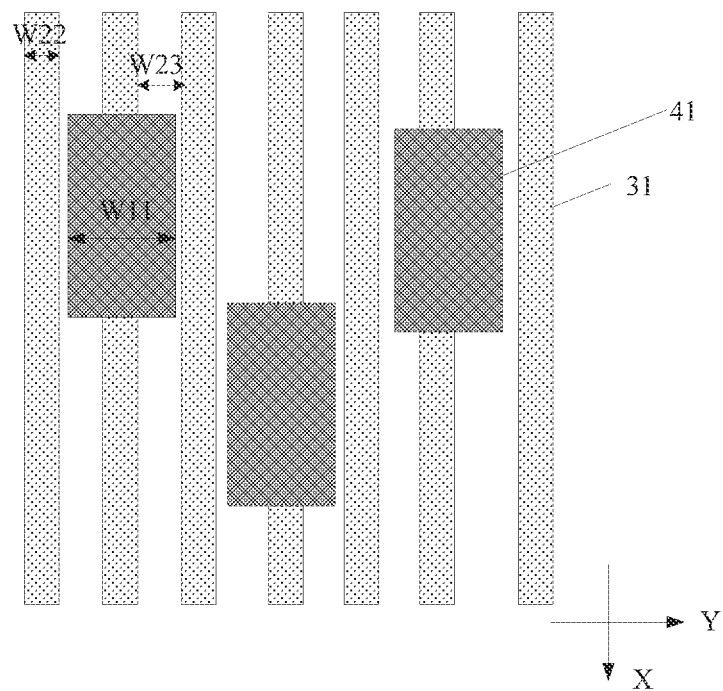
FIG. 12 illustrates a top view of another exemplary grating consistent with various disclosed embodiments of the present disclosure.

On the basis of any of the foregoing embodiments, in one embodiment of the present disclosure, as shown in FIG. 12, the size of the grating electrode 31 along the second direction Y may be W22, and the size of the gap between two adjacent grating electrodes 31 along the second direction may be W23, and W11=m×(W22+W23), and 0<m<4. Such a configuration may allow that the number of grating electrodes 31 overlapping with the first supporting pillars along the second direction Y may be less than 4 to prevent the grating electrodes 31 in the grating from being crushed by the reason that the number of grating electrodes 31 overlapping with the supporting pillars 41 along the second direction Y is too large. As a result, the damage and then failure of the grating may be avoided. It should be noted that the embodiment of the present disclosure only limits the maximum number of grating electrodes that overlapping with the first supporting pillars along the second direction. In practical applications, the number of the grating electrodes overlapped with the first supporting pillars along the second direction may be 2, 3, or 1, which is not limited in the present disclosure, and it depends on the actual situation. It should also be noted that, in the embodiment of the present disclosure, when the projections of the first supporting pillars and the n grating electrodes overlap each other, m and n may be equal, or not equal, depending on the situation.

Figure 13:
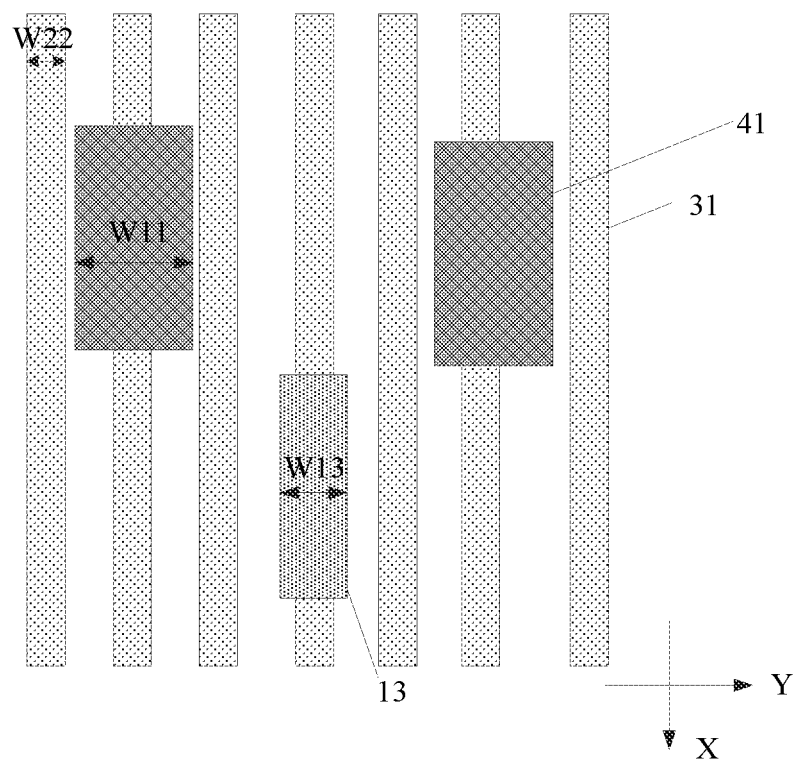
FIG. 13 illustrates a top view of another exemplary grating consistent with various disclosed embodiments of the present disclosure.

On the basis of any of the foregoing embodiments, as shown in FIG. 13, in one embodiment of the present disclosure, the grating may further include a plurality of second supporting pillars 43. The second supporting pillars 43 may be auxiliary supporting pillars; and may be used to support the space between the first substrate and the second substrate together with the first supporting pillars 41.

On the basis of the foregoing embodiment, in one embodiment of the present disclosure, the size W13 of the second support column 43 along the second direction Y may be smaller than the size W11 of the first support column 41 along the second direction Y such that the second supporting pillars 43 may have a smaller size along the second direction Y. Accordingly, along the second direction Y, the second supporting pillars 43 may overlap with a smaller number of grating electrodes 31 and, under the condition that the second supporting pillars 43 may increase the supporting effect between the first substrate and the second substrate, the number of crushed grating electrodes 31 in the grating may be reduced, and the probability of damage to the grating due to crushing of the grating electrodes 31 may be reduced.

On the basis of the foregoing embodiment, in one embodiment of the present disclosure, taking the direction perpendicular to the surface of the first substrate as the projection direction, the number of the grating electrodes overlapped with the projections of the second supporting pillars may be smaller than the number of grating electrodes overlapped by the projections of the first supporting pillars. Accordingly, on the basis of the supporting effect between the first substrate and the second substrate, by reducing the number of grating electrodes overlapped by the second supporting pillars, the number of crushed grating electrodes in the grating may be reduced, and the probability of the grating being damaged due to the grating electrode being crushed may be reduced.

On the basis of any of the foregoing embodiments, in one embodiment of the present application, the grating may include a plurality of repeatedly arranged supporting pillar units, and a supporting pillar unit may include x supporting pillars, and $x \geq 1$. For example, one supporting pillar unit may include at least one supporting pillar.

On the basis of the foregoing embodiment, in one embodiment of the present disclosure, the x supporting pillars may include x first supporting pillars. For example, one supporting pillar unit may include x first supporting pillars. In another embodiment, the x supporting pillars may include x second supporting pillars. For example, one supporting pillar unit may include x second supporting pillars. In another embodiment of the present disclosure, the x supporting pillars may include x first supporting pillars and x second supporting pillars. For example, one supporting pillar unit may include x first supporting pillars and x second supporting pillars. It should be noted that when x is greater than 1, the x supporting pillars may also include at least one first supporting pillar and at least one second supporting pillar, and the sum of the number of the first supporting pillars and the second support pillars may be x.

The following description will be made by taking the x supporting pillars including x first supporting pillars, i.e., one supporting unit including x first supporting pillars, as an example.

Figure 14:
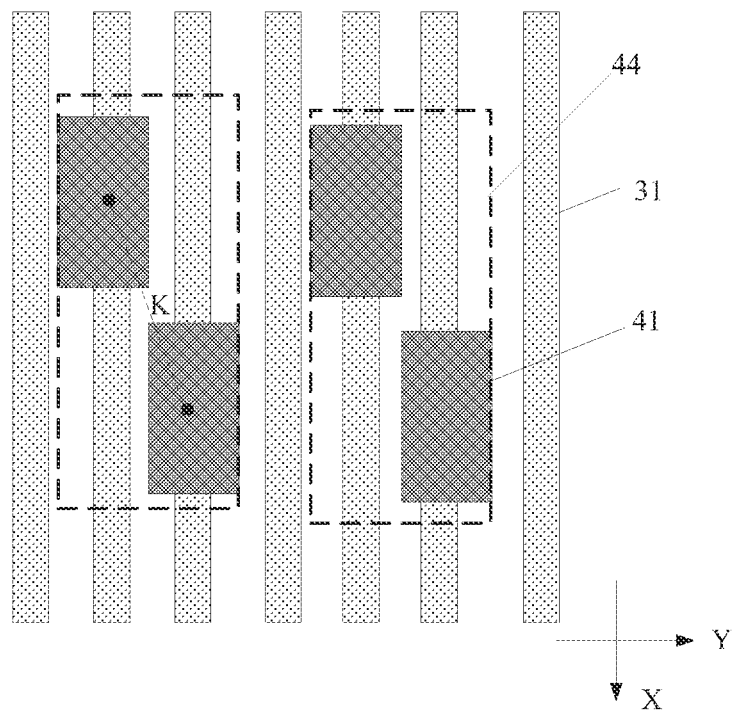
FIG. 14 illustrates a top view of another exemplary grating consistent with various disclosed embodiments of the present disclosure.

For example, on the basis of any of the foregoing embodiments, in one embodiment of the present disclosure, as shown in FIG. 14, x may be equal to 2, that is, one supporting pillar unit 44 may include two supporting pillars. In one embodiment of the present disclosure, the connection line K between the x supporting pillars may intersect the first direction X such that different supporting pillars in the same supporting pillar unit 44 may not overlap with the same grating electrode 31 at the same time. Thus, the situation that the same grating electrode 31 overlaps with different supporting pillars at the same time and is crushed at multiple places may be avoided and the situation that the grating electrode 31 fails to work and causes the grating to be damaged may be avoided.

In one embodiment, the connection line K between the x supporting pillars may be a line between the center points of the x supporting pillars.

Figure 15:
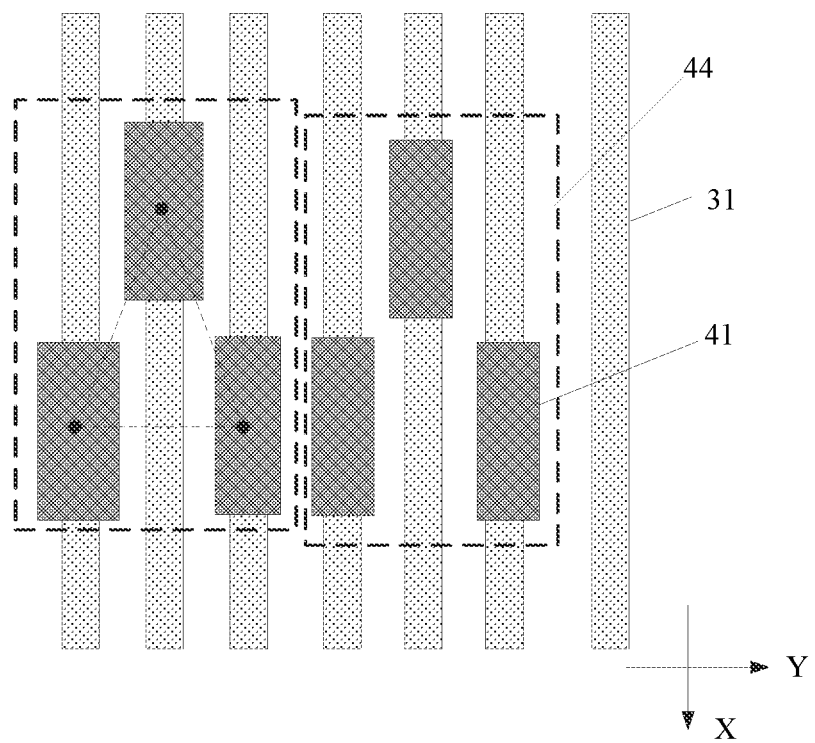
FIG. 15 illustrates a top view of another exemplary grating consistent with various disclosed embodiments of the present disclosure.

In another embodiment of the present disclosure, as shown in FIG. 15, x may be equal to 3, for example, one supporting pillar unit 44 may include three supporting pillars. In such an embodiment, any side of the polygon having the largest area and formed by the x supporting pillars as vertices may all intersect the first direction X such that any two of the vertices of the polygon may not overlap with the same grating electrode 31. Accordingly, the situation that the same grating electrode 31 overlaps with different supporting pillars in the same supporting unit 44 and are crushed in multiple places to cause the grating electrode 31 to fail to work, and cause the grating to be damaged may be avoided.

In one embodiment, the polygon with the largest area formed by the x supporting pillars as vertices may be the polygon with the largest area formed by the centers of the x supporting pillars as the vertices.

In other embodiments of the present disclosure, x may also be other values, for example, one support pillar unit may also include other number of supporting pillars.

On the basis of any of the foregoing embodiments, in one embodiment of the present disclosure, when the grating includes a plurality of supporting pillar units, taking the direction perpendicular to the surface of the first substrate as the projection direction, the projections of the plurality of supporting pillar units may be uniformly distributed such that the light emitted by the grating may be relatively uniform. In the same way, when a supporting pillar unit includes multiple supporting pillars, taking the direction perpendicular to the surface of the first substrate as the projection direction, within the projection range of the supporting pillar unit, the projections of the multiple supporting pillars may be evenly distributed to improve the uniformity of light emitted from the area where each support pillar unit is located.

For example, in one embodiment of the present disclosure, one plane parallel to the surface of the first substrate, the size of the supporting pillar may be 5 μm×30 μm. The size of the supporting pillars is not limited by the present disclosure.

Figure 16:
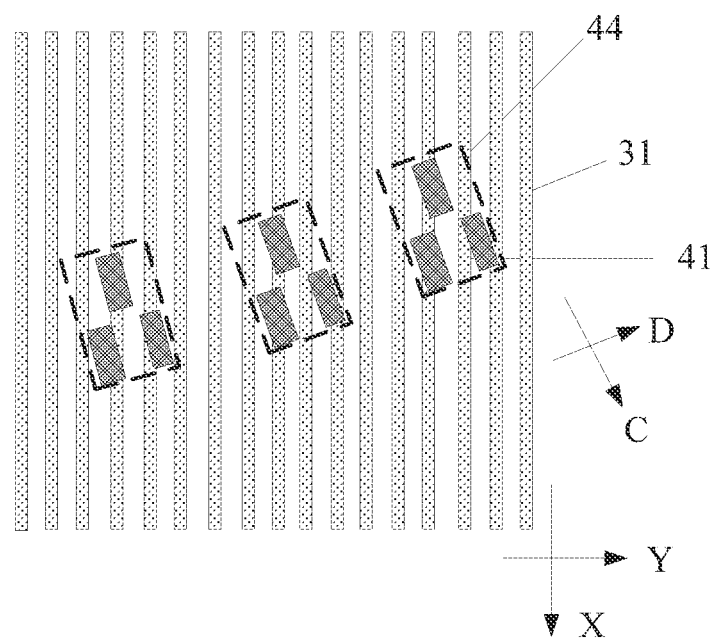
FIG. 16 illustrates a top view of another exemplary grating consistent with various disclosed embodiments of the present disclosure.

On the basis of any of the foregoing embodiments, in one embodiment of the present disclosure, as shown in FIG. 16, the supporting pillar units 44 may extend along a fifth direction C and may be arranged along the sixth direction D. The fifth direction C and the sixth direction D may both intersect the first direction X, and the fifth direction C and the sixth direction D may both intersect the second direction Y to avoid the supporting pillars in the sample supporting pillar unit 44 arranged along the fifth direction C to overlap the same grating electrode 31 and avoid the multiple supporting pillar units 44 arranged along the sixth direction D to overlap the same grating electrode 31. Accordingly, under the premise of the number of s units 44 is not changed, the number of supporting pillars overlapped by one grating electrode 31 may be reduced as much as possible to reduce the probability that the grating electrode 31 is crushed and may not work.

Figure 17:
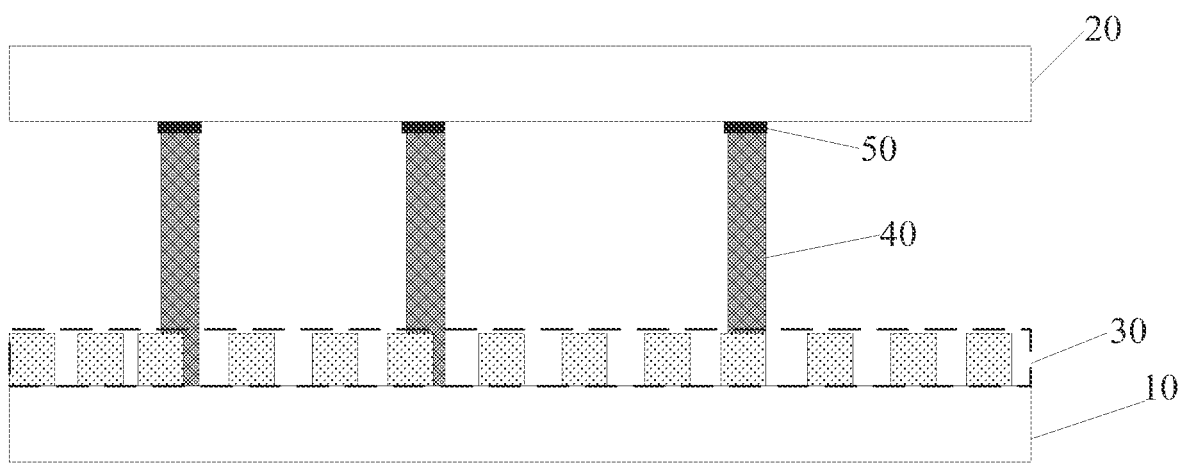
FIG. 17 illustrates a cross-sectional view of another exemplary grating consistent with various disclosed embodiments of the present disclosure.

On the basis of any of the foregoing embodiments, in one embodiment of the present disclosure, as shown in FIG. 17, the grating may further include a light-shielding layer located between the first substrate 10 and the support structure 40. The light-shielding layer may include a plurality of light-shielding units 50. Taking the direction perpendicular to the surface of the first substrate as the projection direction, the light-shielding units 50 may cover a plurality of supporting pillars one-by-one such that the plurality of supporting pillars may be invisible at the light-exiting side of the grating. Accordingly, when the grating is applied to a 3D display device, the arrangement of the plurality of supporting pillars may not affect the display quality of the 3D display device.

On the basis of the above-mentioned embodiment, in one embodiment of the present disclosure, the plurality supporting pillars may include a plurality of first supporting pillars. In another embodiment of the present disclosure, if the grating also includes a plurality of second supporting pillars, and the plurality of supporting pillars may include not only a plurality of first supporting pillars but also a plurality of second supporting pillars.

On the basis of any of the foregoing embodiments, in one embodiment of the present disclosure, the shape of the supporting pillar may have a first pattern, and the shape of the light-shielding unit may have a second pattern. The first pattern and the second pattern may be similar patterns or congruent patterns such that the area of the light-shielding unit may be reduced on the basis of ensuring that the light-shielding unit may completely shield its corresponding supporting pillar. Further, the area of the light-shielding unit may be prevented from being too large and affecting the light exiting rate of the grating.

Figure 18:
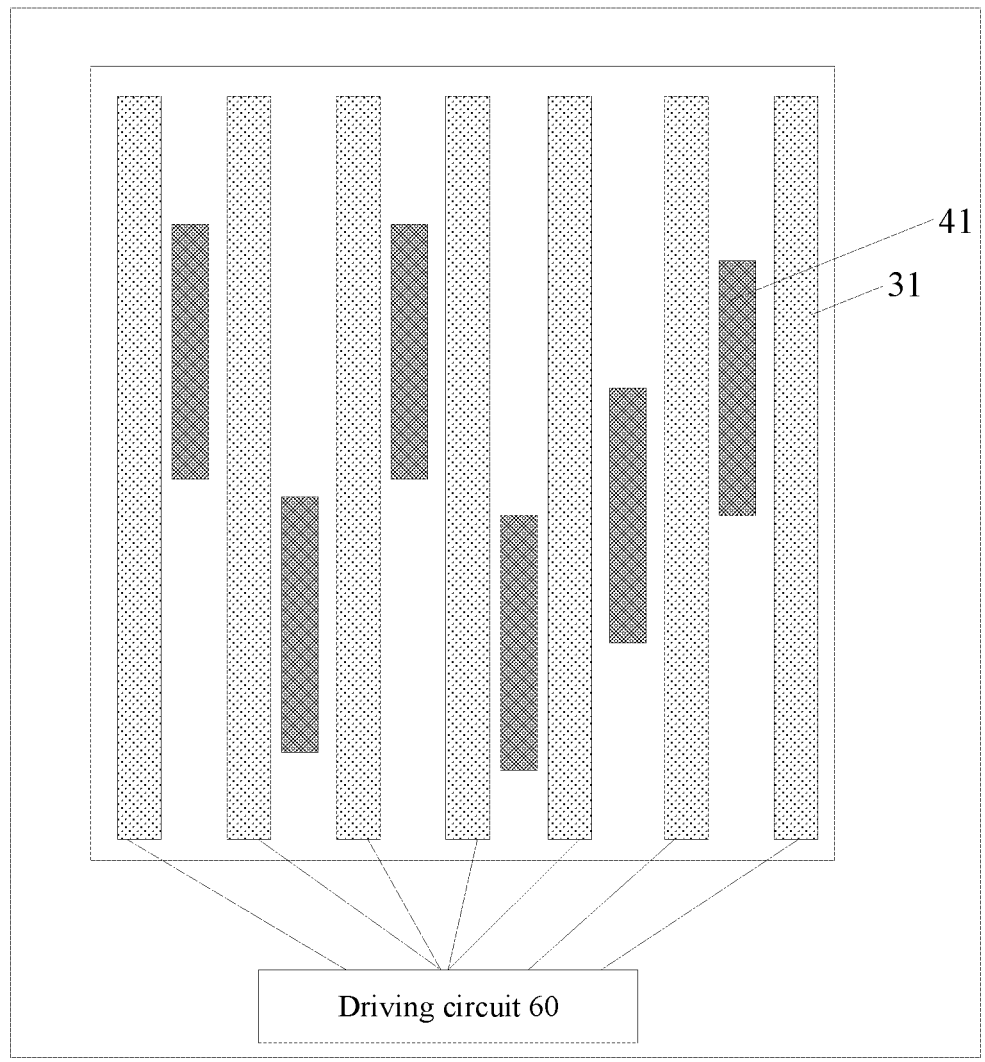
FIG. 18 illustrates a top view of another exemplary grating consistent with various disclosed embodiments of the present disclosure.

On the basis of any of the foregoing embodiments, in one embodiment of the present disclosure, as shown in FIG. 18, the grating may further include at least one driving circuit 60, and the at least one driving circuit 60 may provide a driving signal to the grating electrode 31 to control the grating electrode 31 to achieve the light deflection.

Figure 19:
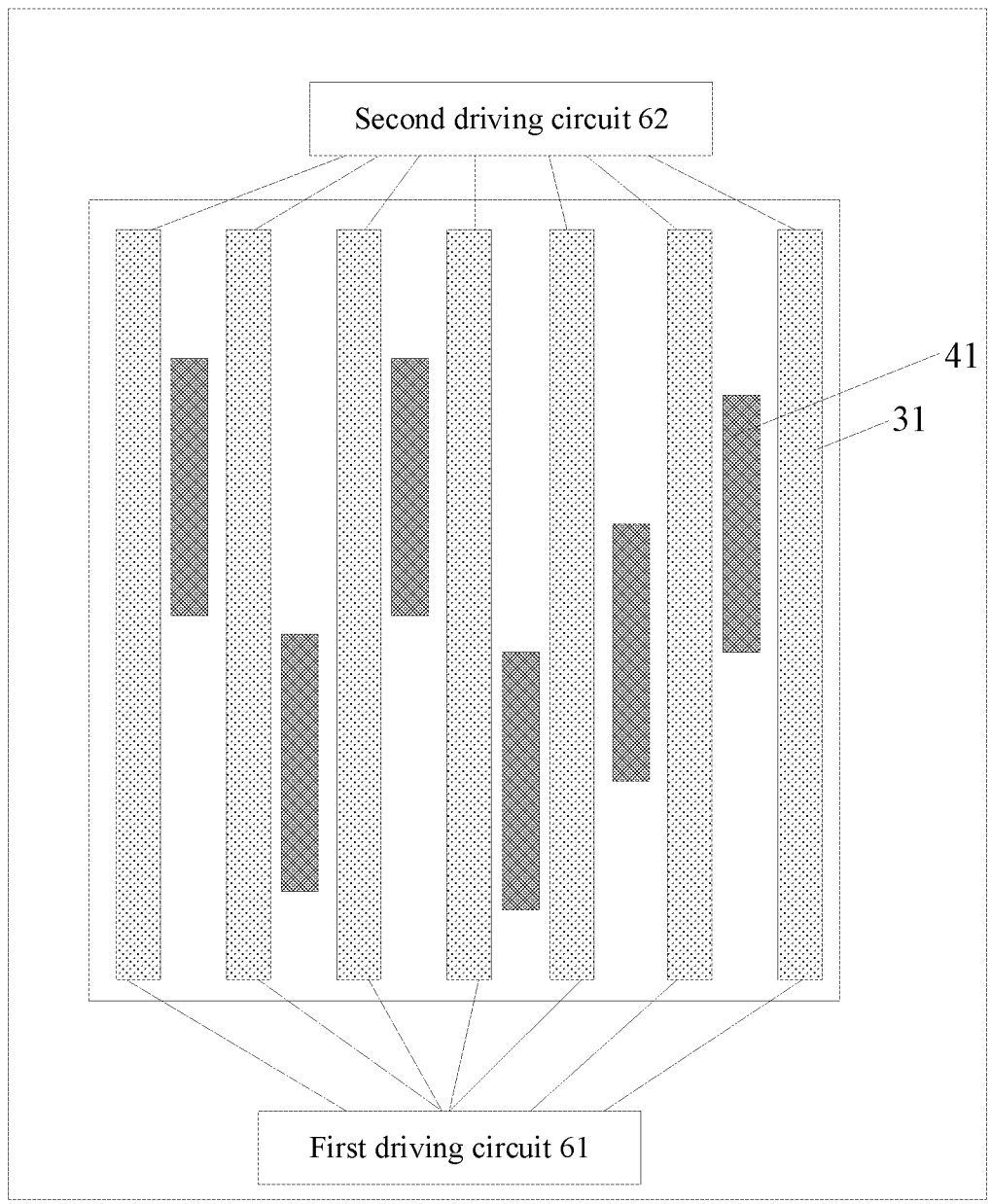
FIG. 19 illustrates a top view of another exemplary grating consistent with various disclosed embodiments of the present disclosure.

On the basis of the foregoing embodiment, in one embodiment of the present disclosure, as shown in FIG. 19, the at least one driving circuit may include a first driving circuit 61 and a second driving circuit 62. The first driving circuit 61 may provide a driving signal for the first end of the grating electrode 31, and the second driving circuit 62 may provide a driving signal for the second end of the grating electrode 31. Accordingly, when the grating electrode 31 is not broken, the grating electrode 31 may be provided with a driving signal through both ends to increase the response speed of the grating electrode 31. At the same time, when only one of the grating electrodes 31 is crushed, the grating electrodes 31 may be provided with the driving signal through both ends to enable the grating electrodes 31 to receive the driving signal everywhere, and the normal operation of the grating electrode 31 may be maintained.

It can be seen from the above that when the at least one driving circuit may control the operation of the grating electrode by providing the driving signals to both ends of the grating electrodes at the same time, if only one of the grating electrodes is broken, the grating electrodes may still work normally and realize the function of light deflection. Therefore, on the basis of the foregoing embodiment, in one optional embodiment of the present disclosure, one grating electrode may overlap with a number a of supporting pillars, and $0 \leq a \leq 1$. Accordingly, one grating electrode in the grating may at most overlap with one supporting pillar such that each grating electrode in the grating may work normally, and the light deflection function may be realized, and may not fail due to crushing of a portion of the grating electrode.

It should be noted that, in a specific application, the grating may include a light-modulating area and a bezel area arranged on the periphery of the light-modulating area. The plurality of grating electrodes may be located in the light-modulating area, and may be configured to deflect the light irradiating the grating. The at least one driving circuit may be located in the bezel area, and may be used to provide driving signals to the grating electrode.

Figure 20:
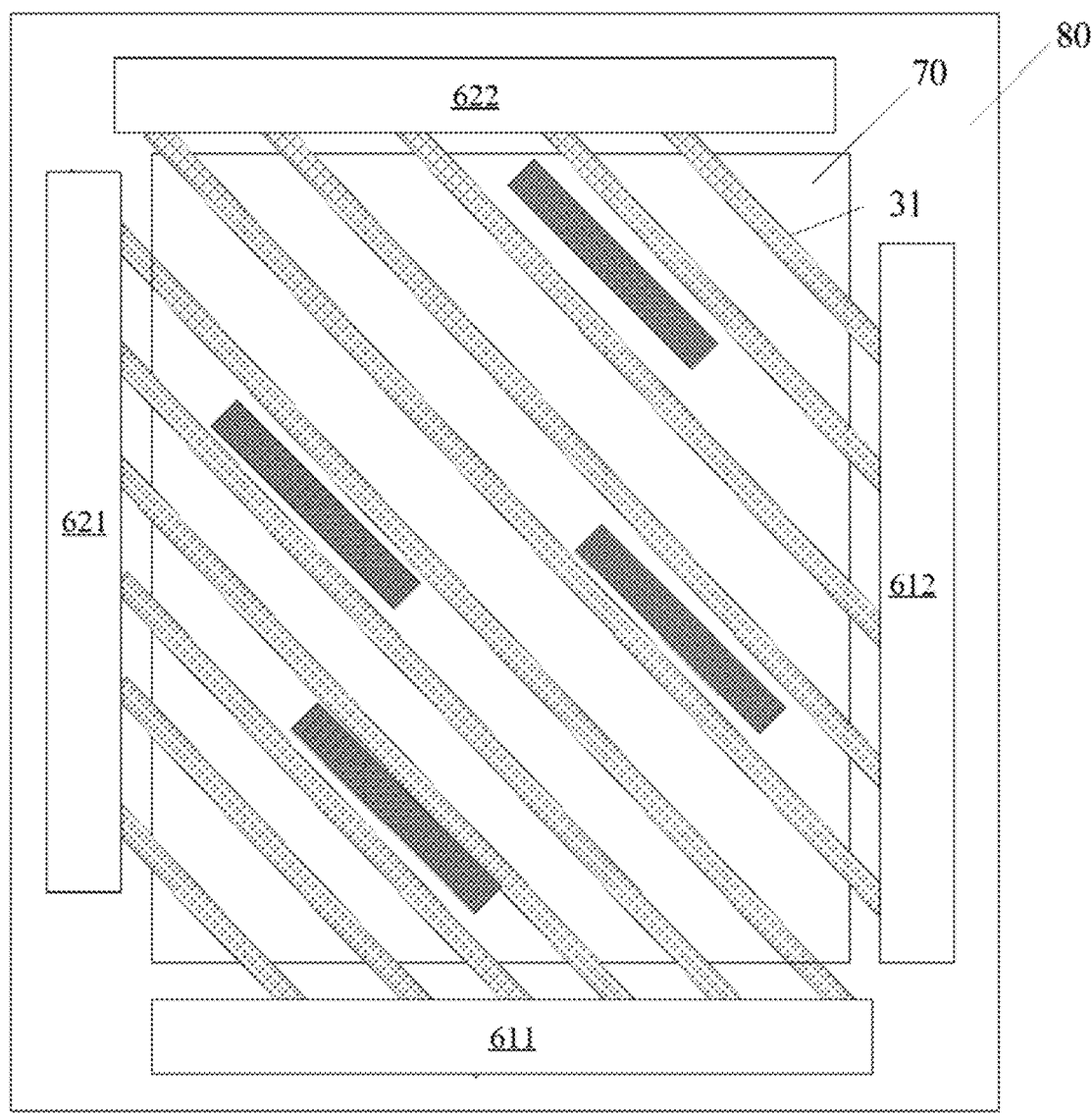
FIG. 20 illustrates a top view of another exemplary grating consistent with various disclosed embodiments of the present disclosure.

On the basis of the foregoing embodiment, in one embodiment of the present disclosure, as shown in FIG. 20, the angle between the extension direction of the grating electrode 31 and the boundary line between the light-modulating area 70 and the bezel area 80 may be greater than 0° and less than 90°. For example, the grating electrode 31 may be arranged obliquely in the light-modulating area 70. In one embodiment of the present disclosure, if the at least one driving circuit includes a first driving circuit and a second driving circuit, the first driving circuit may include a first sub-driving circuit 611 and a second sub-driving circuit 612. The first sub-driving circuit 611 and the second sub-driving circuit 612 may provide driving signals for different grating electrodes 31, and the first sub-driving circuit 611 and the second sub-driving circuit 612 may be located at different sides of the light-modulating area 70. The second driving circuit may include a third sub-driving circuit 621 and a fourth sub-driving circuit 622. The third sub-driving circuit 621 and the fourth sub-driving circuit 622 may provide driving signals for different grating electrodes 31, and the third sub-driving circuit 621 and the fourth sub-driving circuit 622 may be located at different sides of the light modulation area 70. Such a configuration may increase the distance between adjacent grating electrodes, and reduce the area of the bezel area 80 without increasing the area of the light-modulating area 70.

Figure 21:
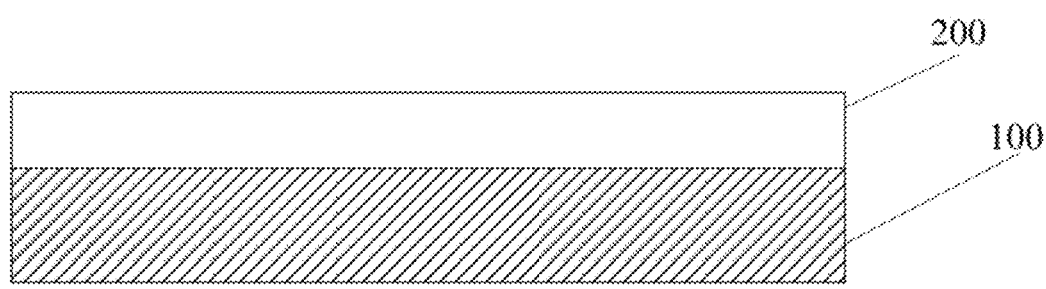
FIG. 21 illustrates an exemplary display device consistent with various disclosed embodiments of the present disclosure.

The present disclosure also provides a display device. FIG. 21 illustrates an exemplary display device consistent with various disclosed embodiment of the present disclosure.

As shown in FIG. 21, the display device may include a display panel 100 and a grating 200 disposed on the light-exiting side of the display panel 100. The grating 200 may be any one of the present disclosed grating. In one embodiment, the display device may be a 3D display device. The type of the display device is not limited by the present disclosure. The structure and specific implementation of the grating may be referred to the previous embodiments.

In summary, in the grating provided by the embodiments of the present disclosure and the display device including the grating, the dimension L11 of the first supporting pillar along the first direction may be greater than the dimension W11 of the first supporting pillar along the second direction. The first direction may be the extension direction of the grating electrode, and the second direction may be perpendicular to the first direction. For example, in the embodiment of the present disclosure, the size of the first supporting pillar along the extension direction of the grating electrode may be greater than the size of the first supporting pillar along the direction perpendicular to the extension direction the grating electrode to reduce the number of the grating electrodes overlapping with the first supporting pillars under the premise of ensuring the supporting effect of the first supporting pillars. Accordingly, the number of grating electrodes in the grating crushed by the first supporting pillars may be reduced, and the probability of damage to the grating due to the large number of grating electrodes crushed by the first supporting pillars may be reduce; and the display quality of the 3D display device may be improved.

The various parts in this manual are described in a combination of parallel and progressive. Each part focuses on the differences from other parts, and the same and similar parts between the various parts may be referred to each other.

For the above description of the disclosed embodiments, the features described in the embodiments in this specification may be replaced or combined with each other such that those skilled in the art may implement or use this disclosure. Various modifications to these embodiments will be obvious to those skilled in the art, and the general principles defined herein may be implemented in other embodiments without departing from the spirit or scope of the present disclosure. Therefore, this disclosure will not be limited to the embodiments shown in this document, but should conform to the widest scope consistent with the principles and novel features disclosed in this disclosure.

What is claimed is:

1. A grating, comprising:
   a first substrate and a second substrate disposed opposite to the first substrate;
   a grating electrode layer disposed on the first substrate, wherein the grating electrode layer includes a plurality of grating electrodes and an extension direction of the plurality of grating electrodes is a first direction; and
   a supporting structure including a plurality of first supporting pillars,
   wherein:
   a length of a first supporting pillar along a third direction is a maximum length L12 of the first supporting pillar;
   a length of the first supporting pillar along a fourth direction is a maximum width W12 of the first supporting pillar;
   the third direction and the fourth direction are both parallel to a plane where the first substrate is located;
   an angle between the first direction and the third direction is $\alpha$;
   $L12 > W12$; and
   $0 \leq \alpha < 45°$.

2. The grating according to claim 1, wherein:
   a size L11 of the first supporting pillar of the plurality of first supporting pillars along the first direction is greater than a size W11 of the supporting pillar along a second direction;
   the first direction and the second direction are both parallel to the plane where the first substrate is located; and
   the first direction is perpendicular to the second direction.

3. The grating according to claim 2, wherein:
the first direction coincides with the third direction.
4. The grating according to claim 1, wherein:
the first supporting pillar is axisymmetric along the first direction;
the first supporting pillar includes a first axis of symmetry along the first direction; and
taking a direction perpendicular to a surface of the first substrate as a projection direction, a projection of the first axis of symmetry is located between a gap between two adjacent grating electrodes of the plurality of grating electrodes.
5. The grating according to claim 3, wherein:
the first supporting pillar includes a first side and a second side extending along the first direction;
taking a direction perpendicular to a surface of the first substrate as a projection direction, a projection of the first side is located in a gap between two adjacent grating electrodes of the plurality of grating electrodes; and/or
a projection of the second side is located in a gap between two adjacent grating electrodes of the plurality of grating electrodes.
6. The grating according to claim 1, wherein:
taking a direction perpendicular to a surface of the first substrate as a projection direction, a projection of the first supporting pillar is located in a gap between two adjacent grating electrodes of the plurality of grating electrodes.
7. The grating according to claim 2, wherein:
a size of a grating electrode of the plurality of grating electrodes along the second direction is W22, wherein a ratio of W22/W11 is larger than ⅕.
8. The grating according to claim 7, wherein:
taking a direction perpendicular to a surface of the first substrate as a projection direction, a projection area of the first supporting pillar is S1;
a projection of the first supporting pillar overlaps with a number n of grating electrodes of the plurality of grating electrodes;
n≥1;
a minimum area of overlapping areas between the projection of the first supporting pillar and the number n of grating electrodes is S2; and
S2>0.14×S1.
9. The grating according to claim 2, wherein:
a size of a grating electrode of the plurality of grating electrodes along the second direction is W22; and
a size of a gap between two adjacent grating electrodes of the plurality of grating electrodes along the second direction is W23, wherein W11 is smaller than four times of a sum of W22 and W23.
10. The grating according to claim 2, further comprising:
a plurality of second supporting pillars,
wherein a size W13 of a second supporting pillar of the plurality of second supporting pillars along the second direction is smaller than the size W11 of the first supporting pillar along the second direction.
11. The grating according to claim 10, wherein:
taking a direction perpendicular to a surface of the first substrate as a projection direction, a number of grating electrodes of the plurality of grating electrodes overlapping with a projection of the second supporting pillar is smaller than a number of grating electrodes of the plurality of grating electrodes overlapping with a projection of the first supporting pillar.

12. The grating according to claim 2, comprising:
a plurality of repeatedly disposed supporting pillar units;
each of the plurality of repeatedly disposed supporting pillar units include a number x of supporting pillars; x≥1; and
the number x of supporting pillars include the number x of first supporting pillars of the plurality of first supporting pillars,
wherein:
when x=2, a connection line of the number x of supporting pillars intersects the first direction; and
when x≥3, any side of a polygon with a maximum area formed by the number x of supporting pillars as vertices intersects the first direction.
13. The grating according to claim 12, wherein:
the plurality of supporting pillar units extend along a fifth direction and are arranged along a sixth direction;
the fifth direction and the sixth direction both intersect the first direction; and
the fifth direction and the sixth direction both intersect the second direction.
14. The grating according to claim 1, further comprising:
a light-shielding layer disposed between the first substrate and the supporting structure,
wherein the light-shielding layer includes a plurality of light-shielding units;
taking a direction perpendicular to a surface of the first substrate as a projection direction, the plurality of light-shielding units cover a plurality of supporting pillars one-by-one; and
the plurality of supporting pillars include the plurality of first supporting pillars.
15. The grating according to claim 14, wherein:
a shape of a supporting pillar of the plurality of supporting pillars has a first pattern;
a shape of a light-shielding unit of the plurality of light-shielding units includes a second pattern; and
the first pattern and the second pattern are similar patterns or congruent patterns.
16. The grating according to claim 1, further comprising:
at least one driving circuit, wherein the at least one driving circuit provides a driving signal for the plurality of grating electrodes.
17. The grating according to claim 16, wherein the at least one driving circuit comprises:
a first driving circuit; and
a second driving circuit,
wherein:
the first driving circuit provides a driving signal for a first end of a grating electrode of the plurality of grating electrodes; and
the second driving circuit provides a driving signal for a second end of the grating electrode of the plurality of grating electrodes.
18. The grating according to claim 17, wherein:
one grating electrode of the plurality of grating electrodes mutually overlaps with a number a of supporting pillars of the plurality of supporting pillars; and
0≤a≤1.
19. The grating according to claim 17, comprising:
a light-modulating area; and
a bezel area located in a peripheral area of the light-modulating area;
the plurality of grating electrodes are located in the light-modulating area; and
the at least one driving circuit is located in the bezel area;
the first driving circuit includes a first sub-driving circuit and a second sub-driving circuit;

the first sub-driving circuit and the second sub-driving circuit provide driving signals for different grating electrodes of the plurality of grating electrodes;

the first sub-driving circuit and the second sub-driving circuit are disposed at different sides of the light-modulating area;

the second driving circuit includes a third sub-driving circuit and a fourth sub-driving circuit;

the third sub-driving circuit and the fourth sub-driving circuit provide driving signals for different grating electrodes of the plurality of grating electrodes;

the third sub-driving circuit and the fourth sub-driving circuit are disposed at different sides of the light-modulating area.

20. A display device, comprising:

a display panel; and a grating disposed on a light-exiting side of the display panel, wherein the grating includes:

a first substrate and a second substrate disposed opposite to the first substrate;

a grating electrode layer disposed on the first substrate, wherein the grating electrode layer includes a plurality of grating electrodes and an extension direction of the plurality of grating electrodes is a first direction; and a supporting structure including a plurality of first supporting pillars, wherein:

a length of a first supporting pillar along a third direction is a maximum length L12 of the first supporting pillar;

a length of the first supporting pillar along a fourth direction is a maximum width W12 of the first supporting pillar;

the third direction and the fourth direction are both parallel to a plane where the first substrate is located;

an angle between the first direction and the third direction is $\alpha$;

L12>W12; and $0 \leq \alpha < 45°$.

* * * * *